United States Patent [19]
Oshino et al.

[11] Patent Number: 5,416,186
[45] Date of Patent: May 16, 1995

[54] PROCESS FOR THE PREPARATION OF (CO)POLYCARBONATE

[75] Inventors: Yasuhiro Oshino, Hiroshima; Tatsuya Kanno, Hyogo, both of Japan

[73] Assignee: Daicel Chemical Industries, Ltd., Osaka, Japan

[21] Appl. No.: 229,292

[22] Filed: Apr. 18, 1994

[30] Foreign Application Priority Data

Apr. 16, 1993 [JP] Japan ............................ 5-089917

[51] Int. Cl.⁶ ............................................. C08G 64/00
[52] U.S. Cl. ..................................... 528/198; 528/196
[58] Field of Search .............................. 528/196, 198

[56] References Cited
FOREIGN PATENT DOCUMENTS

| | | |
|---|---|---|
| 55-142025 | 6/1980 | Japan . |
| 2-153923 | 6/1990 | Japan . |
| 4-72327 | 3/1992 | Japan . |
| 4-88017 | 3/1992 | Japan . |

Primary Examiner—John Kight, III
Assistant Examiner—Terressa Mosley
Attorney, Agent, or Firm—Flynn, Thiel, Boutell & Tanis

[57] ABSTRACT

A process for the preparation of a (co)polycarbonate having an excellent hue, heat resistance, residence to hydrolysis and impact resistance by transesterification with the use of an aparatuses of a low price. In the first step, a dihydroxy compound is reacted with a carbonic diester in a reactor having a surface area contacting the dihydroxy compound and the carbonic diester made of a material containing iron in an amount of 20% by weight or less, to give a prepolymer and, in the second step, melt-polycondensing the prepolymer in a reactor other than the reactor used in the first step.

21 Claims, 1 Drawing Sheet

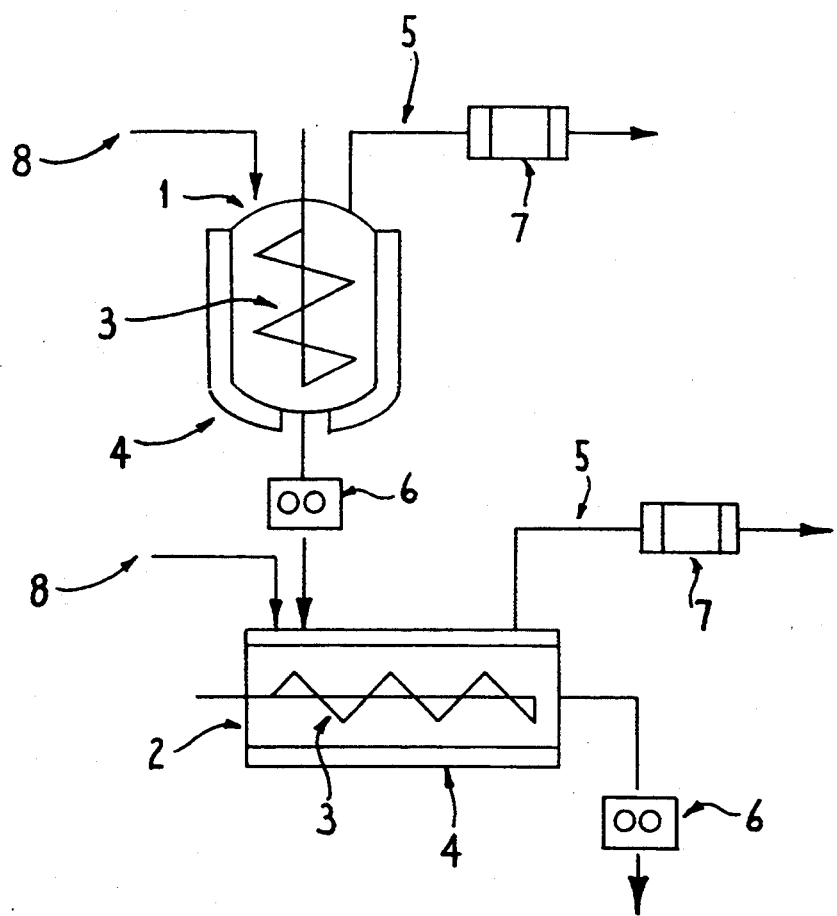

PROCESS FOR THE PREPARATION OF (CO)POLYCARBONATE

BACKGROUND OF THE INVENTION

1. Field of the Invention

The present invention relates to a process for the preparation of a discoloration-free, high-molecular weight (co)polycarbonate by polycondensing a dihydroxy compound with a carbonic diester in the presence of a transesterification catalyst.

2. Description of the Related Art

A high-molecular weight polycarbonate is a general-purpose engineering thermoplastic useful in various fields, particularly as a material for injection molding or a sheet substituting for a window pane. Polycarbonates are generally believed to be excellent in heat resistance, transparency and impact resistance.

Ordinary processes for the preparation of a polycarbonate include the phosgene process wherein the interfacial polycondensation of a dihydroxy compound with phosgene is conducted and the transesterification process wherein a dihydroxy compound is reacted with a carbonic diester in a molten state.

A representative example of the transesterification process comprises reacting a dihydric phenol with a carbonic diester in the presence of a transesterification catalyst and during heating under a reduced pressure while distilling off formed phenol to form a prepolymer and converting the prepolymer into a high-molecular weight polycarbonate by bringing the resulting system finally to 290° C. or above in a high vacuum while distilling off formed phenol [see U.S. Pat. No. 4,345,062 (date of patent: Aug. 17, 1982; assignee: GENERAL ELECTRIC CO.)].

In the transesterification process, it is known that a process which comprises forming a prepolymer in an ordinary tub-type reactor fitted with an agitating blade in the early stage of the reaction and thereafter polycondensing the resulting reaction mixture comprising the prepolymer in a horizontal vented extruder or the like is effective in advancing the reaction efficiently to form a high-molecular weight polycarbonate.

Unlike other engineering plastics, a high-molecular weight polycarbonate, however, has such a high melt viscosity that the preparation thereof necessitates a reaction temperature of as high as 280° C. or above. Further, a high vacuum (of 1 to $10^{-2}$ Torr) is also necessary for distilling off a formed high-boiling monohydric compound. Accordingly, the industrial production of a high-molecular weight polycarbonate is difficult from the standpoint of plant facilities and, further, there is a problem that the reaction conditions described above have a bad influence upon the qualities of the formed polycarbonate, such as hue, heat resistance, residence stability in molding, water resistance, weathering resistance and so forth.

It has been known that the material of a reactor has an influence on the discoloration of the resin prepared in the reactor. For example, it is described in Japanese Patent Publication-A No. 55-142025 and other patent documents that when a resin is prepared in a reactor having a part in contact with the reaction liquid of stainless steel, the resin is discolored. It is described in Japanese Patent Publication-A No. 2-153923 (published on Jun. 13, 1990) that it is preferable for eliminating the influence of a reactor material on the hue of the resin that a least 90% of the total area of the surface in contact with the reaction liquid, i.e., liquid-contacting surface, comprises one or more members selected from among glass, nickel, tantalum, chromium and Teflon. Further, it is described in Japanese Patent Publication-A No. 4-72327 (published on Mar. 6, 1992) that it is preferable that the material of the liquid-contacting surface be a metal or metal alloy containing copper and/or nickel in an amount of 85% by weight or above. Furthermore, the present inventors have disclosed the usefulness of a material having an iron content of 20% by weight or below for the reactor in Japanese Patent Publication-A No. 4-88017 (published on Mar. 19, 1992). Although these means are effective in inhibiting the discoloration of a resin, they have problems in that the use of an expensive material is substantially unavoidable and that the application of a special material to a device having a complicated shape is difficult from the standpoints of processability and obtainment thereof in many cases, which brings about an increase in the cost of equipment, leading directly to an increase in the cost of a product finally.

It has also been known that a boron compound such as boric acid and triphenylborate is useful to prevent the discoloration of the polycarbonate [see U.S. Pat. Nos. 3442854 (assignee: FARBENFAB BAYER AG), 4,590,257 (assignee: GENERAL ELECTRIC CO.; date of patent: May 20, 1986) and 5276109 (assignee: GENERAL ELECTRIC CO.; date of patent: Jan. 4, 1994), and European Patent Publication-A Nos. 351168 (published on Jan. 17, 1990) and 435124 (published on Jul. 3, 1991)]. However, the use of the boron compound sometimes brings about other problem(s).

Under the circumstances described above, the development of a process for the preparation of a polycarbonate at a low cost has eagerly been expected.

DISCLOSURE OF THE INVENTION

Summary of the Invention

The present inventors have made studies on the influence of metallic materials on the discoloration of the (co)polycarbonate and have found that remarkable discoloration occurs in the presence of three specific components, i.e., a metal, a polymerization catalyst and a monohydric compound. The monohydric compound is a by-product formed during the transesterification of a dihydroxy compound with a carbonic diester. Further, the present inventors have made experiments on the discoloration of (co)polycarbonate in the presence of three specific components described above by the use of several metals as the metallic component to find that the most remarkable discoloration occurs when iron is used as the metallic component. Meanwhile, it has also been found that the discoloration is not remarkable when at least one of the three components described above is absent, so that a material having a high iron content can be used as the material of the reactor to be used in the latter stage of the polymerization. The present invention has been accomplished on the basis of these findings.

Thus, the present invention relates to a process for the preparation of a (co)polycarbonate by transesterification, which comprises in the first step, reacting a dihydroxy compound with a carbonic diester in a reactor in which the surface area in contact with the dihydroxy compound and the carbonic diester is made of a material containing iron in an amount of 20% by weight or less, to give a prepolymer and in the second step, melt-polycondensing the prepolymer in a reactor other than the reactor used in the first step.

The reactor used in the second step has advantageously a surface area, contacting the prepolymer, made of a material containing iron in an amount of above 20% by weight.

The (co)polycarbonate obtained in the second step contains preferably a monohydric compound in an amount of 10,000 ppm or below.

The prepolymer obtained in the first step may contain a monohydric compound in an amount of 10 ppm or above, and the (co)polycarbonate obtained in the second step contains a monohydric compound in an amount of 10,000 ppm or below.

The material containing iron in an amount of 20% by weight or less is advantageously selected from the group consisting of glass, ceramics, polyluoroethylene, a metal other than iron, carbon and a metal alloy containing iron in an amount of 20% by weight or less.

The intrinsic viscosity number [$\eta$] of the prepolymer prepared in the first step is generally 0.1 to 0.4 dl/g and that of the (co)polycarbonate prepared in the second polycondensation step is generally 0.3 to 1.0 dl/g.

The intrinsic viscosity number [$\eta$] of the (co)polycarbonate is generally at least 0.15 dl/g higher (or larger) than that of the prepolymer.

The transesterfication is preferably effected in the presence of at least one compound selected from the group consisting of an electron-donor amine, an alkali metal and an alkaline earth metal as a transesterification catalyst.

The transesterification is preferably effected in the presence of a borate as a transesterification catalyst.

The transesterification is preferably effected in the presence of at least one compound selected from the group consisting of a boric acid, a borate and ammonium hydrogenphosphite as an acidic substance.

The compound selected from the group consisting of a boric acid, a borate and ammonium hydrogen-phosphite is advantageously added in the reaction system in the early stage of the reaction.

The reactor used in the first step is preferably a tub type reactor and the reactor used in the second step is preferably a horizontal vented extruder.

The first step is preferably effected by a batch-wise process, and the second step is preferably effected by a continuous process.

Further, the present invention relates to a process for the preparation of a (co)polycarbonate by transesterification, which comprises in the first step, reacting a dihydroxy compound with a carbonic diester in a reactor having a surface area contacting the dihydroxy compound and the carbonic diester made of a material containing iron in an amount of 20% by weight or less, and in the second step, conducting a reaction in a reactor having a surface area in contacting a reaction mixture made of a material containing iron in an amount of above 20% by weight.

In other words, the present invention relates to a process for the preparation of a polycarbonate by melt-polycondensing a dihydroxy compound with a carbonic diester in the presence of a transesterification catalyst, characterized in that the material contacting the reaction mixture has an iron content of 20% by weight or below in the first polycondensation step and the material contacting the reaction mixture has an iron content exceeding 20% by weight in the second polymerization step.

More specifically, the material of the liquid-contacting surface of the apparatus used in the early stage of the reaction must be one having a low iron content, because a large amount of a monohydric compound is present in the reaction mixture in the first step of the polycondensation. However, the monohydric compound is distilled off under reduced pressure from the reaction system with the progress of polycondensation, so that only a small amount of the monohydric compound is present in the reaction mixture in the later stage of the reaction. That is why the resin, i.e., the (co)polycarbonate, is not discolored, even when a material having a high iron content is used as the material of the liquid-contacting surface of the apparatus used in the latter stage. Particularly in the latter polycondensation stage, a reactor having a complicated shape is generally used to agitate a high-molecular weight resin. According to the present invention, however, a material having a high iron content can be used as the material of such a reactor to lower the cost of the apparatus (or equipment), which leads to a lowering in the cost of a product.

Furthermore, the present invention relates to a (co)polycarbonate prepared by the process according to the present invention described above.

BRIEF DESCRIPTION OF THE DRAWING

The present invention will become more fully understood from the detailed description hereinbelow and accompanying drawing which are given by way of illustration only, and thus, are not limitative of the present invention, and wherein:

FIG. 1 illustrates an equipment comprising first reactor (1), second reactor (2), agitating blade (3), heating jacket (4), vacuum line (5), gear pump (6), condenser (7), nitrogen inlet tube (8) for the preparation of a (co)polycarbonate through melt-transesterification.

DETAILED DESCRIPTION OF THE INVENTION

The process for the preparation of a (co)polycarbonate according to the present invention will now be described in more detail.

In the present invention, the term "(co)polycarbonate" includes polycarbonate (homopolymer), copolycarbonate (copolymer) and copolyester carbonate (copolymer). The term "prepolymer" means sometimes a reaction mixture comprising mainly a prepolymer, and the term "(co)polycarbonate" means sometimes a reaction mixture comprising mainly a (co)polycarbonate. The reactor used in the first step and the reactor used in the second step are referred to simply as "first reactor" and "second reactor", respectively. Further, the intrinsic viscosity number [$\eta$] is one determined by the use of a 0.5% methylene chloride solution of a reaction mixture comprising mainly a prepolymer formed or a (co)polycarbonate formed at 20° C. on an Ubbellohde viscometer.

The first step, i.e., the first polycondensation step, in the present invention is one for conducting the early stage reaction of polymerization in the process for preparing a (co)polycarbonate by melt-polycondensing a dihydroxy compound with a carbonic diester in the presence of a transesterification catalyst. The prepolymer finally obtained in this step has an intrinsic viscosity number [$\eta$] of 0.1 to 0.4 dl/g. The prepolymer obtained in this step may contain a monohydric compound, e.g., phenol, in an amount of 10 ppm or above, preferably from 10 to 10,000 ppm, still preferably from 10 to 1,000 ppm and most preferably from 10 to 100 ppm. The prepolymer obtained in this step is subjected to the second polycondensation step. When a second reactor having a surface area, contacting the prepolymer, made of a material containing iron in an amount of above 20% by weight, is used and the prepolymer obtained in the first step contains a monohydric compound in an amount of exceeding 10,000 ppm, the (co)polycarbonate which will be obtained may be remarkably discolored.

The second polycondensation step is one for the later-stage reaction of polymerization wherein transesterification is conducted subsequent to the first polycondensation step. The polymer, i.e., (co)polycarbonate, finally obtained in this step has an intrinsic viscosity number [$\eta$] of 0.3 to 1.0 dl/g. The intrinsic viscosity number [$\eta$] of the (co)polycarbonate is generally at least 0.15 dl/g higher than that of the prepolymer obtained in the first step. When the second reactor has a surface area contacting the prepolymer and the (co)polycarbonate made of a material containing iron in an amount of above 20% by weight, the (co)polycarbonate obtained in this step must have a monohydric compound concentration of 10,000 ppm or below. The concentration is preferably 1,000 ppm or below, still preferably 100 ppm or below. When the (co)polycarbonate contains a monohydric compound in an amount of exceeding 10,000 ppm, the (co)polycarbonate will be remarkably discolored.

The equipment for the first and second polycondensation steps may each comprise a plurality of apparatuses, such as reactors, pipes and so forth.

In the first reactor according to the present invention, at least the surface thereof in contact with the starting materials, i.e., the dihydroxy compound and the carbonic diester, and the prepolymer formed, must be made of a material having an iron content of 20% by weight or below, preferably 10% by weight or below. Specific examples of such a material include metallic materials such as metal alloys, e.g., Hastelloy B (comprising 64 wt % of nickel, 1 wt % of chromium, 28 wt % of molybdenum and 5 wt % of iron), Hastelloy C-276 (comprising 59 wt % of nickel, 15.5 wt % of chromium, 16 wt % of molybdenum and 5.5 wt % of iron), Hastelloy G-30 (comprising 43 wt % of nickel, 7 wt % of molybdenum, 20 wt % of iron, 22 wt % of chromium and 12 wt % of aluminum), Inconel 600 (comprising 76 wt % of nickel, 15.5 wt % of chromium and 8 wt % of iron), Inconel 657 (comprising 48 wt % of nickel and 50 wt % of chromium), Cupronickel C-7150 (comprising 30 wt % of nickel and 70 wt % of copper), Nickel 200 (comprising 99.5 wt % of nickel and 0.08 wt % of carbon) and Monel 400 (comprising 66.5 wt % of nickel, 81.5 of copper and 2 wt % of iron), and metals other than iron; glass; ceramics; and polyfluoroethylenes such as Teflon. The first reactor may be made of the above material, integrally, or alternatively, only the surface area of the first reactor, contacting the dihydroxy compound and the carbonic diester, and needless to say the prepolymer as well, may be made of the above material. The first reactor, only the surface area of which is made of the above material, may be made by plating, thermal spraying or cladding with the above material to form a surface layer thereof. Further, a combination of several materials having an iron content of 20% or below may be used.

In the second reactor, the material of its surface area is not limited. That is, a material having a high iron content may be used for the surface area of the second reactor. At least the surface area of the second reactor contacting the prepolymer may be made of a material having an iron content exceeding 20%, even 30% or above. Specific examples of materials having an iron content exceeding 20% include SUS-304 (comprising 8 wt % of nickel, 74 wt % of iron and 18 wt % of chromium), SUS-316 (comprising 12 wt % of nickel, 2 wt % of molybdenum, 68 wt % of iron and 18 wt % of chromium), SS (comprising 100 wt % of iron), Incolloy 825 (comprising 42 wt % of nickel, 2.2 wt % of molybdenum, 30 wt % of iron, 21.5 wt % of chromium and 2.2 wt % of copper), Incolloy 800 (comprising 32.5 wt % of nickel, 46.5 wt % of iron and 21 wt % of chromium) and Carpenter 20 (comprising 35 wt % of nickel, 2.5 wt % of molybdenum, 37 wt % of iron, 20 wt % of chromium and 3.5 wt % of copper). The second reactor may be made of the above material, integrally, or alternatively only the surface area of the second reactor contacting the prepolymer, and needless to say, the (co)polycarbonate as well, may be made of the above material. The second reactor, only the surface area of which is made of the above material, may be made by plating, thermal spraying or cladding with the above material to form a surface layer thereof. Further, a combination of several materials may be used.

One example of the process for the preparation of a (co)polycarbonate by the melt transesterification process according to the present invention will now be described briefly by referring to the attached drawing.

FIG. 1 shows one example of the equipment used for preparing a (co)polycarbonate by the melt transesterification process. Each of the first reactor (1) and the second reactor (2) is fitted with an agitating blade (3), a heating jacket (4), a vacuum line (5), a gear pump (6), a condenser (7) and a nitrogen gas inlet tube (8). The vacuum line (5) is used to remove a monohydric compound formed as a by-product with the progress of the reaction from the reaction mixture in the reactor. The monohydric compound distilled off from the reaction mixture is condensed in the condenser (7), separated and recovered. The gear pumps (6), (6) are devices for transferring a prepolymer formed in the first reactor, and a (co)polycarbonate formed in the second step, respectively.

The first reactor is generally of a tub type such as a tank reactor. It is preferable that the second reactor be a horizontal vented extruder or the like, because a high-viscosity resin must be treated therein. The first step is generally conducted by a batch-wise process, while the second step is generally by a continuous process to enhance the producibility of a (co)polycarbonate. However, the reaction in each reactor may be conducted by any of batch-wise and continuous processes. The first reactor may be connected to the second one through a pipe, or alternatively, the first reactor is not connected to the second one. In the latter case, the resin, i.e., the prepolymer, formed in the first step may be taken out of the firs reactor and solidified, and then may be remelted and fed into the second reactor. Further, in the latter case, a deaerator may be set between the resin melter and the second reactor. The deaerator may be a thin-film evaporator or a vented extruder. Although the deaerator may be used under normal pressures, it is preferable to use it under a reduced pressure.

Next, the polycondensation conditions according to the present invention will be described.

In the first step, a dihydroxy compound and a carbonic diester are fed into the first reactor, and then, a catalyst is added into the reactor to initiate transesterification. The reaction temperature of the first step may range generally from 60° to about 300° C., preferably from 130° to 280° C. When the reaction temperature is lower than 130° C., the reaction will be too slow, while when it exceeds 280° C., a side reaction will be likely to occur. The internal pressure of the first reactor may range generally from normal pressure to 0.1 Torr. Then the internal pressure is too high, a monohydric compound formed as a by-product will not be efficiently removed from the reaction system, while when it is too low, the carbonic diester and/or dihydroxy compound used as starting monomers will be distilled off, which will bring about a change in the molar ratio between compounds having reactive terminals to make the preparation of a high-molecular weight (co)polycarbonate difficult.

In the second step, the resin, i.e., the prepolymer, formed in the first reactor is transferred to the second reactor in a molten state by the use of a gear pump. The reaction temperature of the second step may range from 200° to about 310° C., preferably from 220° to 300° C. When the reaction temperature is lower than 220° C., not only will the reaction be too slow, but also the melt viscosity of the resin, i.e., the (co)polycarbonate, will be too high, which will make it difficult to remove a monohydric compound formed as a by-product efficiently from the reaction system. On the contrary, when the reaction temperature is higher than 300° C., a side reaction will be likely to occur. Further, the internal pressure of the second reactor is 10 Torr or below, preferably 1 Torr or below, still preferably 0.5 Torr or below. When the internal pressure is too high, a monohydric compound formed as a by-product will not be efficiently removed from the reaction system.

Preferable examples of the dihydroxy compound used as a starting monomer in the present invention include 2,2-bis(4-hydroxyphenyl)propane, 2,2-bis(4-hydroxyphenyl)butane, 2,2-bis(4-hydroxyphenyl)-4-methylpentane, 2,2-bis(4-hydroxyphenyl)octane, 4,4'-dihydroxy-2,2,2-triphenylethane, 2,2-bis(3,5-dibromo-4-hydroxyphenyl)propane, 2,2-bis(4-hydroxy-3-methylphenyl)propane, 2,2-bis(4-hydroxy-3-isopropylphenyl)propane, 2,2-bis(4-hydroxy-3-sec-butylphenyl)propane, 2,2-bis(4-hydroxy-3-t-butylphenyl)propane, 2,2-bis-(3,5-dimethyl-4-hydroxyphenyl)propane, 1,1'-bis-(4-hydroxyphenyl)-p-diisopropylbenzene, 1,1'-bis-(4-hydroxyphenyl)-m-diisopropylbenzene, 1,1-bis-(4-hydroxyphenyl)cyclohexane and the like. Among them, 2,2-bis(4-hydroxyphenyl)propane is particularly preferred. These dihydroxy compounds can be used either alone or in combination of two or more members among them for the production of a copolycarbonate.

Representative examples of the carbonic diester include bisaryl carbonates such as diphenyl carbonate, ditolyl carbonate, bis(2,4-dichlorophenyl) carbonate, bis(2,4,6-trichlorophenyl)carbonate, m-cresyl carbonate, dinaphthyl carbonate, bis(2-cyanophenyl) carbonate, bis(o-nitrophenyl) carbonate and the like; dicycloalkyl carbonates such as dicyclohexyl carbonate and the like; and dialkyl carbonates such as dimethyl carbonate, diethyl carbonate, dibutyl carbonate and the like. Among them, bisaryl carbonates are preferable, and diphenyl carbonate is particularly preferred.

In the present invention, one or more carbonic diester(s) is(are) used as a monomer(s). Alternatively, a combined use of the carbonic diester with a dicarboxylic acid ester and/or a dicarboxylic acid is suitable in the present invention. Examples of the dicarboxylic acid ester include diphenyl terephthalate and diphenyl isophthalate. Examples of the dicarboxylic acid include terephthalic acid and isophthalic acid. In this case, the amount of the sum of the dicarboxylic acid ester and the dicarboxylic acid is 50 mole % or below based on the sum of the amounts of the carbonic diester, the dicarboxylic acid and the dicarboxylic acid ester, and a copolyester carbonate is obtained by melt-polycondensation. Namely, in the present invention, the term "carbonic diester" includes generally the dicarboxylic acid (ester), too. When two or more carbonic diesters are used, a copolymer is obtained.

In the preparation of a (co)polycarbonate according to the present invention, it is necessary to use the above carbonic diester in an amount (by mol) equivalent to that of a dihydroxy compound present in the reaction system. Generally, a carbonic diester must be reacted with a dihydroxy compound at a molar ratio of 1:1 in order to obtain a high-molecular weight (co)polycarbonate. When diphenyl carbonate is used as the carbonic diester, 2 mol of phenol is formed by the above reaction, which is distilled off of the reaction system. However, it is desired to use a carbonic diester in an amount of 1.01 to 1.5 mol, preferably 1.015 to 1.20 mol per mol of the dihydroxy compound, because the carbonic diester used as a starting monomer is often distilled off from the reaction system together with a monohydric compound formed as a by-product.

In the present invention, a terminal-blocking agent such as a carbonic diester compound, an ester and a phenol compound may be used in preparing a (co)polycarbonate by reacting a dihydroxy compound with a carbonic diester in the presence of a transesterification catalyst. The amount of the terminal-blocking agent to be used is 0.05 to 10 mole %, preferably 1 to 5 mole, based on the dihydroxy compound.

The transesterification catalyst usable in the present invention includes electron-donor amines, alkali metals, alkaline earth metals and borates. Further, the transesterification catalyst also includes metals such as Na, K, Be, Ca, St, Ba, Zn, Cd, Al, Cr, Mo, Fe, Co, Ni, Ag, Au, Sn, Sb, Pb, Pt and Pd; and alcoholates, oxides, carbonates, acetates and hydrides of these metals.

Representative examples of the electron-donor amines include 4-dimethylaminopyridine, 4-diethylaminopyridine, 4-pyrrolidinopyridine, pyridine, 4-aminopyridine, 2-aminopyridine, 2-hydroxypyridine, 4-hydroxypyridine, 2-methoxypyridine, 4-methoxypyridine, picoline, pyrimidine, 2-dimethylaminoimidazole, 2-methoxyimidazole, 2-mercaptoimidazole, aminoquinoline, imidazole, 1-methylimidazole, 2-methylimidazole, 4-methylimidazole, pyrazole, benzimidazole, N,N-dimethylaniline, pyrrolidine, morpholine, N-methylmorpholine, piperidine, piperazine, 1,4-diazabicyclo[2.2.2]octane (DABC0), 1,8-diazabicyclo[5.4.0]-7-undecene (DBU) and 1,5-diazabicyclo[4.3.0]-5-nonene (DBN).

Representative examples of the alkali metals and alkaline earth metals include sodium hydroxide, lithium hydroxide, potassium hydroxide, sodium hydrogencarbonate, lithium hydrogencarbonate, potassium hydrogencarbonate, sodium carbonate, lithium carbonate, potassium carbonate, sodium acetate, lithium acetate, potassium acetate, sodium stearate, lithium stearate, potassium stearate, sodium borohydride, lithium borohydride, potassium bonohydride, sodium benzoate, lithium benzoate, potassium benzoate, barium hydroxide, calcium hydroxide, magnesium hydroxide, barium hydrogencarbonate, calcium hydrogencarbonate, magnesium hydrogencarbonate, barium carbonate, calcium carbonate, magnesium carbonate, barium acetate, calcium acetate, magnesium acetate, barium stearate, calcium stearate and magnesium stearate.

Representative examples of the borates as the transesterification catalyst include sodium diborate, sodium teraborate, sodium pentaborate, sodium hexaborate, sodium octaborate, lithium metaborate, lithium tetraborate, lithium pentaborate, potassium metaborate, potassium tetraborate, potassium pentaborate, potassium hexaborate, potassium octaborate, ammonium metaborate, ammonium tetraborate, ammonium penaborate, ammonium ocaborate, ammonium borate, teramethylammonium borate, aluminum potassium borate, cadmium borate, silver borate, copper borate, lead borate, nickel borate, magnesium borate and manganese borate.

These transesterification catalysts may be used either alone or a combination of two or more of them in the present invention. The catalyst(s) may be added either at once at the feeding of the monomers or in portions during the reaction.

The amount of the transesterification catalyst to be used is $10^{-8}$ to $10^{-1}$ mol, preferably $10^{-7}$ to $10^{-2}$ mol, per mol of the dihydroxy compound fed. When the amount is less than $10^{-8}$ mol, the catalytic activity will be low and result in too slow a polycondensation, while when it exceeds $10^{-1}$ mol, the resulting (co)polycarbonate will be highly contaminated with the catalyst and have poor physical properties.

The boric acid as an acidic substance include metaboric acid, orthoboric acid, tetraboric acid and so forth. Among them, orthoboric acid is preferred. Representative examples of the borate as an acidic substance include triphenyl borate, trimethyl borate, triethyl borate, butyl borate and tritolyl borate. Further, ammonium hydrogenphosphite is also used as an acidic substance.

The acidic substance may be added in the early stage of the reaction, in the middle stage of the reaction or after the completion thereof, and is preferably added in the early stage of the reaction. The acidic substance added neutralizes the basic polymerization catalyst, serving to improve the heat stability of the (co)polycarbonate.

The acidic substance is used in an amount of 0.01 to 500 mol, preferably 0.01 to 10 mol based on 1 mol of the basic catalyst. When the amount is less than 0.01 mol, the resulting (co)polycarbonate will have little improvement in heat stability, while when it exceeds 500 mol, the resulting (co)polycarbonate will unfavorably have too low a degree of polymerization.

When the boric acid or borate is used as the acidic substance, the amount thereof is still preferably 0.01 to 0.5 mol, based on 1 mol of the basic catalyst.

The boric acid or borate is used in such amount that the amount of the boron atom of the boric acid or borate is 0.01 to 500 mol, preferably 0.01 to 10 mol, based on 1 mol of the basic group of the electrondonor amine as the catalyst. The boric acid or borate is used in such an amount that the amount of the boron atom of the boric acid or borate is 0.01 to 500 mol, preferably 5 to 200 mol based on 1 mol of the alkali metal or alkaline earth metal atom of the alkali metal or alkaline earth metal as the catalyst. The boric acid or borate is used in such amount that the amount of the boron atom of the boric acid or borate is 0.01 to 500 mol, based on 1 mol of the sum of the basic group of the electon-donor amine and the alkali metal or alkaline earth metal atom of the alkali metal or alkaline earth metal.

The ammonium hydrogenphosphite is used as an acidic substance in such amount that the amount of the phosphorus atom of the ammonium hydrogenphosphite is 0.01 to 500 mol based on 1 mol of the basic group of the electron-donor amine as the catalyst. The ammonium hydroenphosphite is used in such amount that the amount of the phosphorus atom of the ammonium hydroenphosphite is 0.01 to 500 mol based on 1 mol of the alkali metal or alkaline earth metal atom of the alkali metal or alkaline earth metal as the catalyst. The ammonium hydrogenphosphite is used in such amount that the amount of the phosphorus atom of the ammonium hydroenphosphite is 0.01 to 500 mol based on 1 mol of the sum of the basic group of the electron-donor amine and the alkali metal or alkaline earth metal atom of the alkali metal or alkaline earth metal.

EXAMPLES

The present invention will now be described in more detail with reference to the following Examples, which shouldnot be considered to limit the scope of the present invention.

In the Examples and Comparative Examples, the intrinsic viscosity number [$\eta$], hue and monohydric compound concentration were determined and evaluated as follows:

Intrinsic viscosity number [$\eta$]:

The intrinsic viscosity number of each prepolymer or (co)polycarbonate was evaluated by determining the viscosity of a 0.5% methylene chloride solution of the prepolymer or the (co)polycarbonate at 20° C. with a Ubbellohde viscometer.

Hue:

The hue of each prepolymer or (co)polycarbonate was evaluated by determining the absorbances of a 10% methylene chloride solution of the prepolymer or the (co)polycarbonate at 380 nm and 580 nm and calculating the difference between the absorbances, i.e., $A_{380}-A_{580}$. It is preferable that the hue value be 1.0 or below. Further, the hue thereof was evaluated with the naked eye.

Monohydric compound concentration:

The monohydric compound concentration of each prepolymer or (co)polycarbonate was determined with a gas chromatograph (mfd. by Shimadzu Corporation, GC-14A) using Silicon OV-210 as a stationary phase.

EXAMPLE 1

4.57 kg (20 mol) of 2,2-bis(4-hydroxyphenyl)propane, 4.39 kg (20.5 mol) of diphenyl carbonate and 0.489 g (0.004 mol) of 4-dimethylaminopyridine were put in a 20-1 tub-type reactor made of Hastelloy C-276 (iron content: 5.5% by weight). The contents in the reactor were melted at 160° C. in a nitrogen atmosphere and fully stirred. The obtained mixture was heated under stirring while gradually reducing the pressure in the reaction system to bring the reaction system finally to 1 Torr and 260° C., while formed phenol was distilled off. Thus, a prepolymer was obtained which had an intrinsic viscosity number [$\eta$] of 0.3 dl/g, a hue value ($A_{380}-A_{580}$) of 0.06 and a phenol concentration of 350 ppm. This prepolymer was transferred from the bottom of the reactor to a horizontal reactor for polycondensation which was made of a stainless steel (SUS-316) (iron content: 68% by weight) and controlled to be at 280° C. and 0.1 Torr through a gear pump. Continuous polycondensation was conducted in the horizontal reactor with a residence time of 50 minutes to obtain a polycarbonate. The obtained polycarbonate was colorless and transparent and had an intrinsic viscosity number [$\eta$] of 0.5 dl/g, a hue value ($A_{380}$–$A_{580}$) of 0.09 and a phenol concentration of 30 ppm.

EXAMPLE 2

22.8 g (0.1 mol) of 2,2-bis(4-hydroxyphenyl)propane, 21.9 g (0.1025 mol) of diphenyl carbonate and 0.098 mg ($1 \times 10^{-6}$ mol) of potassium acetate were put in a flask made of Inconel 600 (iron content: 8% by weight). The contents in the flask were melted at 180° C. in a nitrogen atmosphere and fully stirred. The obtained mixture was heated while gradually reducing the pressure in the reaction system to bring the reaction system finally to 1 Torr and 260° C., while the phenol formed was distilled off. Thus, a prepolymer was obtained which had an intrinsic viscosity number [$\eta$] of 0.35 dl/g, a hue value ($A_{380}$–$A_{580}$) of 0.07 and a phenol concentration of 830 ppm. This prepolymer was put in a flask made of Incolloy 800 (iron content: 46.5% by weight) and reacted at 280° C. in a vacuum of 0.1 Torr to obtain a polycarbonate. The obtained polycarbonate was colorless and transparent and had an intrinsic viscosity number [$\eta$] of 0.52 dl/g, a hue value ($A_{380}$–$A_{580}$) of 0.08 and a phenol concentration of 20 ppm.

EXAMPLE 3

The same procedure as that of Example 2 was repeated except that the materials of the reactors were varied as specified in Table 1 and that the catalyst was changed to a combination of 2.48 m ($2 \times 10^{-5}$ mol) of 4-dimethylaminopyridine with 0.02 m ($5 \times 10^{-7}$ mol) of sodium hydroxide. The obtained polycarbonate was colorless and transparent. Other characteristic values of the polycarbonate are given in Table 1.

EXAMPLE 4

The same procedure as that of Example 2 was repeated except that the materials of the reactors were varied as specified in Table 1 and that the catalyst was changed to 0.145 mg ($7.2 \times 10^{-7}$ mol) of sodium tetraborate. The obtained polycarbonate was colorless and transparent. Other characteristic values of the polycarbonate are given in Table 1.

EXAMPLE 5

The same procedure as that of Example 2 was repeated except that the materials of the reactors were varied as specified in Table 1 and that the catalyst was changed to 0.16 mg ($4 \times 10^{-6}$ mol) of sodium hydroxide. The obtained polycarbonate was colorless and transparent. Other characteristic values of the polycarbonate are given in Table 1.

EXAMPLE 6

The same procedure as that of Example 2 was repeated except that the materials of the reactors were varied as specified in Table 1, that the catalyst was changed to 0.05 mg ($5 \times 10^{-7}$ mol) of potassium acetate and that 0.31 mg ($5 \times 10^{-6}$ mol) of boric acid was further added in the early stage of the reaction. The obtained polycarbonate was colorless and transparent. Other characteristic values of the polycarbonate are given in Table 1.

Comparative Example 1

The same procedure as that of Example 2 was repeated except that the materials of the reactors were varied as specified in Table 1 and that the catalyst was changed to 2.48 mg ($2 \times 10^{-5}$ mol) of 4-dimethylaminopyridine. The obtained polycarbonate was red. Other characteristic values of the polycarbonate are given in Table 1.

Comparative Example 2

The same procedure as that of Example 2 was repeated except that the materials of the reactors were varied as specified in Table 1 and that the catalyst was changed to 0.16 mg ($4 \times 10^{-6}$ mol) of sodium hydroxide. The obtained polycarbonate was red. Other characteristic values of the polycarbonate are given in Table 1.

Comparative Example 3

The same procedure as that of Example 2 was repeated except that the materials of the reactors were varied as specified in Table 1 and that the catalyst was changed to 0.05 mg ($5 \times 10^{-7}$ mol) of potassium acetate. The obtained polycarbonate was red. Other characteristic values of the polycarbonate are given in Table 1.

Comparative Example 4

The same procedure as than of Example 2 was repeated except that the materials of the reactors were varied as specified in Table 1 and that the catalyst was changed to 0.16 mg ($4 \times 10^{-6}$ mol) of sodium hydroxide. The obtained polycarbonate was red. Other characteristic values of the polycarbonate are given in Table 1.

TABLE 1

| | First reactor | | Second reactor | | | Prepolymer obtained in 1st step | | Polycarbonate obtained in 2nd step | | Hue of polycarbonate (UV) $A_{380}$–$A_{580}$ |
|---|---|---|---|---|---|---|---|---|---|---|
| | material | Iron content (% by wt.) | material | Iron content (% by wt.) | Catalyst | Intrinsic viscosity number [$\eta$] (dl/g) | phenol concn. (ppm) | Intrinsic viscosity number [$\eta$] (dl/g) | phenol concn. (ppm) | |
| Ex. 1 | Hastelloy C-276 | 5.5 | SUS-316 | 68 | 4-dimethylamino-pyridine | 0.30 | 350 | 0.50 | 30 | 0.09 |
| Ex. 2 | Inconel 600 | 8 | Incolloy 800 | 46.5 | potassium acetate | 0.35 | 830 | 0.52 | 20 | 0.08 |
| Ex. 3 | Hastelloy C-276 | 5.5 | SUS-316 | 68 | 4-dimethylamino-pyridine sodium hydroxide | 0.30 | 1,050 | 0.49 | 35 | 0.10 |

TABLE 1-continued

|  | First reactor | | Second reactor | | | Prepolymer obtained in 1st step | | Polycarbonate obtained in 2nd step | | Hue of polycarbonate (UV) $A_{380}-A_{580}$ |
|---|---|---|---|---|---|---|---|---|---|---|
|  | material | Iron content (% by wt.) | material | Iron content (% by wt.) | Catalyst | Intrinsic viscosity number [η] (dl/g) | phenol concn. (ppm) | Intrinsic viscosity number [η] (dl/g) | phenol concn. (ppm) |  |
| Ex. 4 | Hastelloy C-276 | 5.5 | SUS-316 | 68 | sodium borate |  |  |  |  |  |
| Ex. 5 | Nickel 200 | 0 | Carpenter 20 | 37 | sodium hydroxide | 0.33 | 820 | 0.48 | 40 | 0.08 |
| Ex. 6 | Inconel 600 | 8 | Incolloy 800 | 46.5 | potassium acetate (boric acid was added in the early stage of the first step) | 0.34 | 900 | 0.50 | 30 | 0.08 |
| Comp. Ex. 1 | SUS-316 | 68 | SUS-316 | 68 | 4-dimethylamino-pyridine | 0.25 | 1,500 | 0.39 | 210 | 0.22 |
| Comp. Ex. 2 | SUS-316 | 68 | SUS-316 | 68 | sodium hydroxide | 0.30 | 1,200 | 0.41 | 120 | 0.35 |
| Comp. Ex. 3 | Incolloy 800 | 46.5 | Incolloy 825 | 30 | potassium acetate | 0.30 | 1,150 | 0.41 | 160 | 0.32 |
| Comp. Ex. 4 | Carpenter 20 | 37 | Incolloy 800 | 46.5 | sodium hydroxide | 0.32 | 970 | 0.40 | 250 | 0.29 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A process for preparing a (co)polycarbonate by transesterification comprising the steps of reacting a dihydroxy compound with a carbonic diester in a reactor having a surface in contact with the reactants made of a material not containing iron in an amount exceeding 20% by weight to produce a prepolymer having an intrinsic viscosity number of 0.1 to 0.4 dl/g, said reaction being in the presence of a catalyst of at least one compound selected from the group consisting of an electron-donor amine, an alkali metal and an alkaline earth metal, and melt-polycondensing the prepolymer in a reactor having a surface in contact with the prepolymer made of a material containing iron in an amount exceeding 20% by weight to produce a (co)polycarbonate having an intrinsic viscosity number of 0.3 to 1.0 dl/g and a monohydric compound concentration not exceeding 10,000 ppm, the intrinsic viscosity number of the (co)polycarbonate being at least 0.15 dl/g higher than that of the prepolymer.

2. A process for preparing a (co)polycarbonate by transesterification comprising the steps of reacting a dihydroxy compound with a carbonic diester in a reactor having a surface in contact with the reactants made of a material not containing iron in an amount exceeding 20% by weight to produce a prepolymer and melt-polycondensing the prepolymer in a reactor having a surface in contact with the prepolymer made of a material containing iron in an amount exceeding 20% by weight to produce a (co)polycarbonate.

3. The process for the preparation of a (co)polycarbonate by transesterification according to claim 2, wherein the (co)polycarbonate obtained in the second step contains a monohydric compound in an amount of 10,000 ppm or below.

4. The process for the preparation of a (co)polycarbonate by transesterification according to claim 2, wherein the prepolymer obtained in the first step contains a monohydric compound in an amount of 10 ppm or above, and the (co)polycarbonate obtained in the second step contains a monohydric compound in an amount of 10,000 ppm or below.

5. The process for the preparation of a (co)polycarbonate by transesterification according to claim 2, wherein the material containing iron in an amount not exceeding 20% by weight or less is selected from the group consisting of glass, ceramics, polyfluoroethylene, a metal, carbon and a metal alloys.

6. The process for the preparation of a (co)polycarbonate by transesterification according to claim 2, wherein the intrinsic viscosity number [η] of the prepolymer prepared in the first step is 0.1 to 0.4 dl/g and that of the (co)polycarbonate prepared in the second polycondensation step is 0.3 to 1.0 dl/g.

7. The process for the preparation of a (co)polycarbonate by transesterification according to claim 6, wherein the intrinsic viscosity number [η] of the (co)polycarbonate is at least 0.15 dl/g higher than that of the prepolymer.

8. The process for the preparation of a (co)polycarbonate by transesterification according to claim 2, wherein at least one compound selected from the group consisting of an electron-donor amine, an alkali metal and an alkaline earth metal is used as a transesterification catalyst.

9. The process for the preparation of a (co)polycarbonate by transesterification according to claim 2, wherein a borate is used as a transesterification catalyst.

10. The process for the preparation of a (co)polycarbonate by transesterification according to claim 8, wherein at least one compound selected from the group consisting of a boric acid, a borate and ammonium hydrogenphosphite is used as an acidic substance.

11. The process for the preparation of a (co)polycarbonate by transesterification according to claim 9, wherein at least one compound selected from the group consisting of a boric acid, a borate and ammonium hydroenphosphite is used as an acidic substance.

12. The process for the preparation of a (co)polycarbonate by transesterification according to claim 10, wherein the boric acid is orthoboric acid.

13. The process for the preparation of a (co)polycarbonate by transesterification according to claim 11, wherein the boric acid is orthoboric acid.

14. The process for the preparation of a (co)polycarbonate by transesterification according to claim 10, wherein the compound selected from the group consisting of a boric acid, a borate and ammonium hydrogenphosphite to added at the reaction system in an initial stage of the reaction.

15. The process for the preparation of a (co)polycarbonate by transesterification according to claim 11, wherein the compound selected from the group consisting of a boric acid, a borate and ammonium hydroenphosphite is added to the reaction system at an initial stage of the reaction.

16. The process for the preparation of a (co)polycarbonate by transesterfication according to claim 7, wherein the reactor used in the first step is a tub type reactor and the reactor used in the second step is a horizontal vented extruder.

17. The process or the preparation of a (co)polycarbonate by transesterification according to claim 2, wherein the first step is effected by a batch-wise process and the second step is effected by a continuous process.

18. A (co)polycarbonate prepared by the process according to claim 2.

19. The process for the preparation of a (co)polycarbonate by transesterification according to claim 2, wherein the prepolymer obtained in the first step contains a monohydric compound in an amount of from 10 to 10,000 ppm and the (co)polycarbonate obtained in the second step contains a monohydric compound in an amount of 10,000 ppm or below.

20. The process for the preparation of a (co)polycarbonate by transesterification according to claim 2, wherein the prepolymer obtained in the first step contains a monohydric compound in an amount of from 10 to 1,000 ppm and the (co)polycarbonate obtained in the second step contains a monohydric compound in an amount of 1,000 ppm or below.

21. The process for the preparation of a (co)polycarbonate by transesterification according to claim 2, wherein the prepolymer obtained in the first step contains a monohydric compound in an amount of from 10 to 100 ppm and the (co)polycarbonate obtained in the second step contains a monohydric compound in an amount of 100 ppm or below.

* * * * *

UNITED STATES PATENT AND TRADEMARK OFFICE
CERTIFICATE OF CORRECTION

PATENT NO. : 5,416,186
DATED : May 16, 1995
INVENTOR(S) : Yasuhiro OSHINO et al

It is certified that error appears in the above-indentified patent and that said Letters Patent is hereby corrected as shown below:

| | |
|---|---|
| Column 14, lines 64-65; | change "hydroenphosphite" to ---hydrogenphosphite---. |
| Column 15, line 13; | change "hydroen-" to ---hydrogen- ---. |
| Column 15, line 17; | change "transesterfication" to ---transesterification---. |
| | change "claim 7" to ---claim 2---. |
| Column 15, line 21; | change "or" to ---for---. |

Signed and Sealed this

Tenth Day of October, 1995

Attest:

BRUCE LEHMAN

Attesting Officer

Commissioner of Patents and Trademarks